United States Patent
Tanaka et al.

(10) Patent No.: US 11,936,636 B2
(45) Date of Patent: Mar. 19, 2024

(54) COMMUNICATION DEVICE, COMMUNICATION METHOD, AND COMMUNICATION SYSTEM

(71) Applicant: KABUSHIKI KAISHA TOSHIBA, Tokyo (JP)

(72) Inventors: Yasuyuki Tanaka, Kawasaki Kanagawa (JP); Yoshimichi Tanizawa, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 69 days.

(21) Appl. No.: 17/671,869

(22) Filed: Feb. 15, 2022

(65) Prior Publication Data

US 2023/0078461 A1  Mar. 16, 2023

(30) Foreign Application Priority Data

Sep. 15, 2021  (JP) ................. 2021-150317

(51) Int. Cl.
*H04L 29/06* (2006.01)
*H04L 9/08* (2006.01)
(Continued)

(52) U.S. Cl.
CPC ......... *H04L 63/0485* (2013.01); *H04L 9/085* (2013.01); *H04L 45/121* (2013.01)

(58) Field of Classification Search
None
See application file for complete search history.

(56) References Cited

U.S. PATENT DOCUMENTS 8,098,827 B2 * 1/2012 Okaue ............... H04L 9/0836
380/278
9,648,022 B2 * 5/2017 Peterka ............... H04L 67/01
(Continued)

FOREIGN PATENT DOCUMENTS

JP  2000-261486 A  9/2000
JP  2014-78875 A   5/2014

OTHER PUBLICATIONS

Michael G. Reed et al., "Anonymous Connections and Onion Routing", Proc. of 1997 IEEE Symposium on Security and Privacy, 15 pages (1997).

(Continued)

*Primary Examiner* — Maung T Lwin
(74) *Attorney, Agent, or Firm* — Finnegan, Henderson, Farabow, Garrett & Dunner, LLP

(57) ABSTRACT

According to an embodiment, a communication device includes one or more processors. The processors share encryption keys with a plurality of external communication devices. The processors, based on residual quantities of the encryption keys, decide on a route for sending transmission data. The processors encrypt, for each external communication device of one or more external communication devices included in the route, a header in which the external communication device is set as a destination, using an encryption key shared with the external communication device. The processors generate a packet that includes the transmission data and encrypted headers for the one or more external communication devices. The processors send the generated packet along the route.

10 Claims, 14 Drawing Sheets

(51) Int. Cl.
*H04L 9/40* (2022.01)
*H04L 45/121* (2022.01)

(56) References Cited

U.S. PATENT DOCUMENTS

| | | | |
|---|---|---|---|
| 11,057,293 B2* | 7/2021 | Aguado | H04L 9/085 |
| 11,122,018 B2* | 9/2021 | Boynton | H04L 63/0471 |
| 2008/0205652 A1* | 8/2008 | Nakano | G11B 20/00086 |
| 2008/0288771 A1* | 11/2008 | Kulakowski | H04L 9/16 |
| | | | 713/150 |
| 2009/0327703 A1* | 12/2009 | Feudo | H04L 9/321 |
| | | | 713/168 |
| 2011/0075845 A1 | 3/2011 | Calcev et al. | |
| 2012/0066492 A1* | 3/2012 | Gamer | H04W 12/069 |
| | | | 713/156 |
| 2014/0143443 A1 | 5/2014 | Takahashi et al. | |
| 2015/0236852 A1* | 8/2015 | Tanizawa | H04L 9/0858 |
| | | | 380/278 |
| 2018/0309734 A1* | 10/2018 | Yu | G06F 21/602 |
| 2019/0306131 A1* | 10/2019 | Dolev | H04L 63/061 |
| 2020/0280437 A1* | 9/2020 | Yuan | H04L 9/0822 |
| 2020/0304477 A1 | 9/2020 | Venkataraman | |
| 2021/0314143 A1* | 10/2021 | Conner | H04L 63/067 |

OTHER PUBLICATIONS

Mehrdad Dianati et al., "Architecture and protocols of the future European quantum key distribution network," Security Comm. Networks, vol. 1, No. 1, pp. 57-74 (2008).

* cited by examiner

FIG.4

| PARTNER NODE | KEY IDENTIFIER | KEY VALUE |
|---|---|---|
| RELAY NODE 200a | 100 | aaaaaaaaaaaaaaaaaa |
| RELAY NODE 200a | 101 | 111111111111111111 |
| RELAY NODE 200a | 102 | AAAAAAAAAAAAAAAA |
| RELAY NODE 200b | 100 | bbbbbbbbbbbbbbbbbb |
| RELAY NODE 200b | 200 | 222222222222222222 |
| RELAY NODE 200c | 300 | cccccccccccccccccc |
| RELAY NODE 200c | 310 | 333333333333333333 |
| RELAY NODE 200d | 1000 | dddddddddddddddddd |
| RELAY NODE 200d | 1001 | 444444444444444444 |
| RECEIVING NODE | 100 | hhhhhhhhhhhhhhhhhh |
| RECEIVING NODE | 200 | 555555555555555555 |

COMMUNICATION DEVICE, COMMUNICATION METHOD, AND COMMUNICATION SYSTEM

CROSS-REFERENCE TO RELATED APPLICATIONS

This application is based upon and claims the benefit of priority from Japanese Patent Application No. 2021-150317, filed on Sep. 15, 2021; the entire contents of which are incorporated herein by reference.

FIELD

Embodiments described herein relate generally to a communication device, a communication method, and a communication system.

BACKGROUND

In the communication performed using a public network such as the Internet, there are times when encryption is performed in order to keep the packets confidential. For example, the transmission node shares an encryption key in advance with the receiving node; and encrypts a transmission packet using that encryption key according to one-time encryption. Then, the receiving node decrypts the received packet using the same encryption key.

Sometimes the packets are transferred via one or more relay nodes. For example, in a configuration in which a plurality of relay nodes is present in between the transmission node and the receiving node, a plurality of pairs of neighboring nodes present on the relay route for the packet share an encryption key in advance. The transmission node or a relay node encrypts a transmission packet according to one-time encryption. Then, either the next relay node or The receiving node decrypts the received packet using the concerned encryption key.

BRIEF DESCRIPTION OF THE DRAWINGS

FIG. 2 is a functional block diagram of a transmission node;

FIGS. 3 and 4 are diagrams illustrating examples of a method implemented by a key managing unit for managing encryption keys;

DETAILED DESCRIPTION

Figure 1:
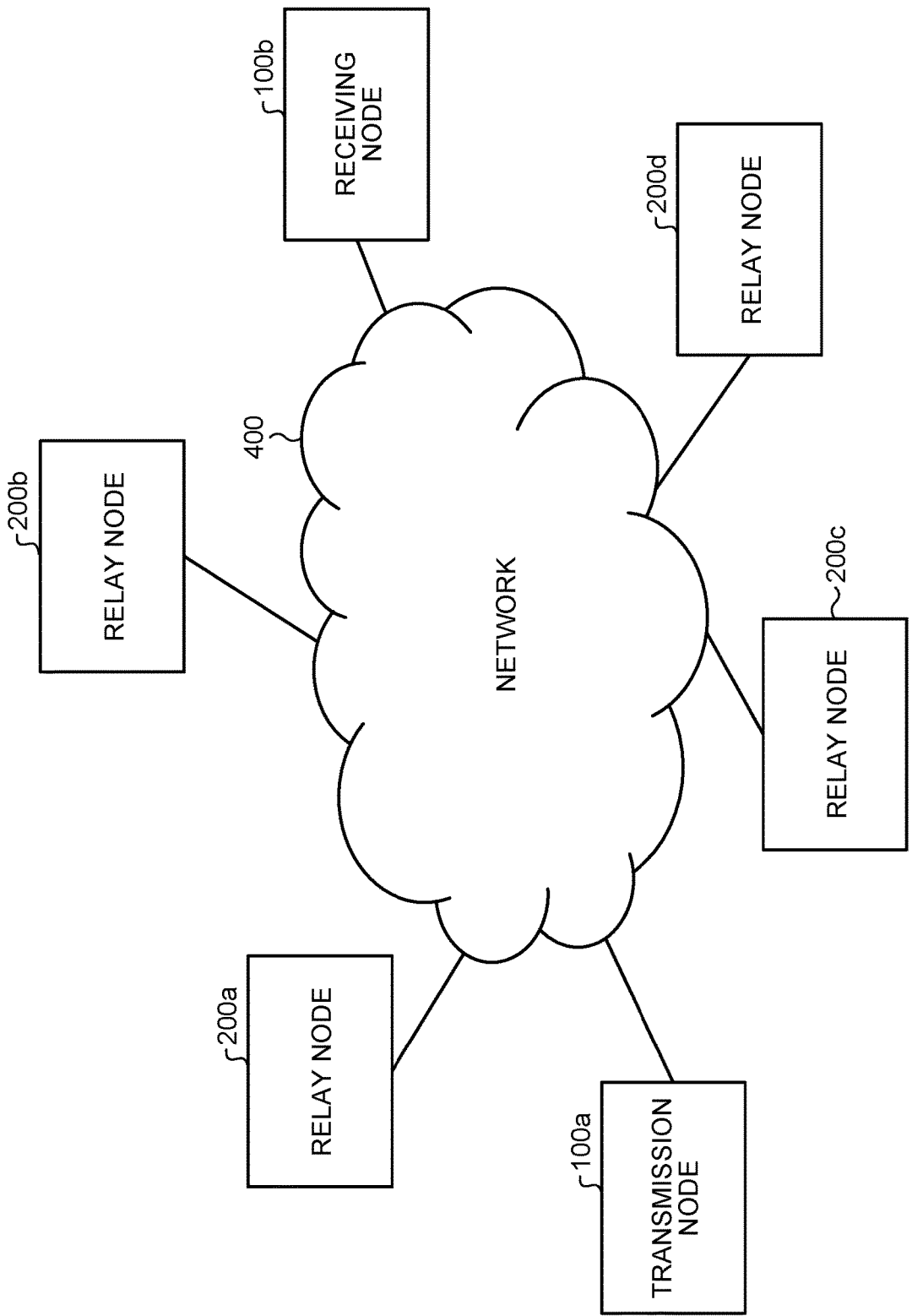
FIG. 1 is a block diagram illustrating an exemplary configuration of a communication system that includes communication devices according to an embodiment.

According to an embodiment, a communication device includes one or more processors. The processors share encryption keys with a plurality of external communication devices. The processors, based on residual quantities of the encryption keys, decide on a route for sending transmission data. The processors encrypt, for each external communication device of one or more external communication devices included in the route, a header in which the external communication device is set as a destination, using an encryption key shared with the external communication device. The processors generate a packet that includes the transmission data and encrypted headers for the one or more external communication devices. The processors send the generated packet along the route.

An exemplary embodiment of a communication device according to the present invention is described below in detail with reference to the accompanying drawings.

As explained earlier, in the conventional technology, for example, sometimes the header of a packet in which information about the source (the transmission node) and the destination (the receiving node) is written is not encrypted. In such a case, an attacker or a relay node on the relay route becomes able to get the information about the source and the destination by referring to the header. That is, there are times when the identity of the communication partner cannot be kept confidential.

The communication device according to the present embodiment generates (builds) a packet in which the header is encrypted so as to keep the communication partner unidentifiable, and then sends the generated packet. That enables achieving enhancement in the confidentiality of the information.

In the following explanation, the communication device representing the source of a packet is sometimes called a transmission node (an example of a transmission device), and the communication device representing the destination of the packet is sometimes called a receiving node an example of a receiving device). Moreover, a communication device that relays the packet is called a relay node (an example of a relay device).

In the present embodiment, encryption keys are shared in advance among the transmission node, the receiving node, and a plurality of relay nodes capable of relaying packets. At the time of sending a packet to the receiving node, the transmission node decides on the relay route for the packet, and then sets relay route information indicating the decided relay route in the header of the packet. The relay route information is encrypted using the encryption keys that are already shared by the transmission node with the relay nodes and the receiving node. The encrypted relay route information is set in the header in such a way that any relay node gets to know only about the next relay destination for the packet (i.e., the next relay node).

The transmission node decides on the relay route by taking into account, for example, the residual quantities of the encryption keys that are being shared with the relay nodes and the relay route information that was used in the previously-sent packet. Moreover, the relay route can be decided in such a way that the number of relay nodes is equal to or greater than a prescribed number that indicates the minimum number of relay nodes to be used in relaying a packet.

FIG. 1 is a block diagram illustrating an exemplary configuration of a communication system that includes the communication devices according to the present embodiment. As illustrated in FIG. 1, the communication system is so configured that a transmission node 100a, a receiving node 100b, and a plurality of relay nodes 200a to 200d are connected to each other via a network 400.

The network 400 can be a wired network, or a wireless network, or a mixed network including a wired network and a wireless network. In the case of using a wired network, an Ethernet (registered trademark) cable or an optical cable is typically used as the connection media for the network 400. In the case of using a wireless network, a cellular phone network connection or a wireless LAN (LAN stands for local area network) is typically used.

The network 400 can be a wide area network such as the Internet, or can be closed network over a wide area. Meanwhile, in FIG. 1, network devices such as network switches and route are not illustrated.

In FIG. 1, only a single transmission node 100a and only a single receiving node 100b are illustrated. However, the communication system can include a plurality of transmission nodes 100a and a plurality of receiving nodes 100b. The relay nodes 200a to 200d have an identical configuration to each other. Hence, when the relay nodes 200a to 200d need not be distinguished from each other, they are sometimes simply referred to as relay nodes 200. Moreover, the number of relay nodes 200 is not limited to four.

The transmission node 100a and the receiving node 100b perform packet communication. In the present embodiment, the explanation is given for an example in which a packet is sent from the transmission node 100a to the receiving node 100b. The transmission node 100a shares an encryption key with the receiving node 100b as well as shares encryption keys with a plurality of relay nodes 200.

Figures 2, 3:
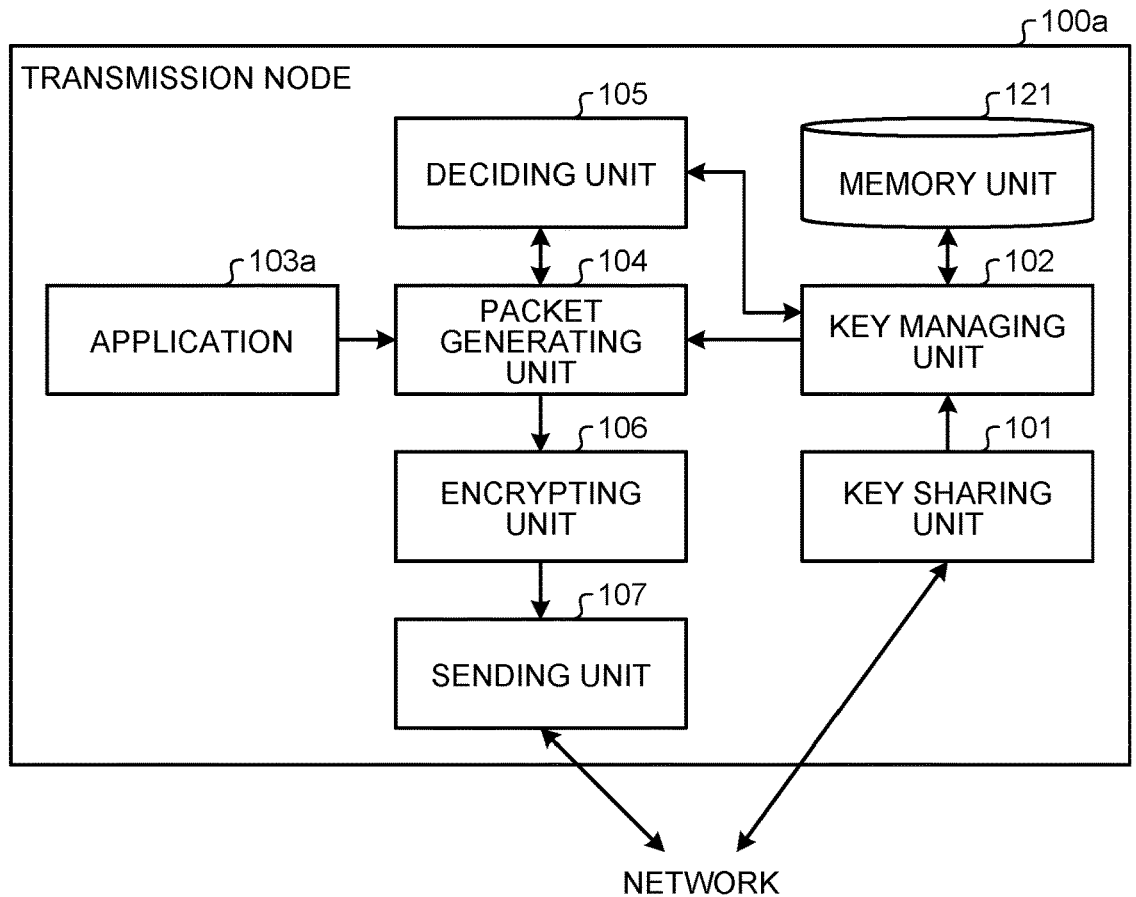

FIG. 2 is a block diagram illustrating an exemplary functional configuration of the transmission node 100a. As illustrated in FIG. 2, the transmission node 100a includes a memory unit 121, a key sharing unit 101, a key managing unit 102, an application 103a, a packet generating unit 104, a deciding unit 105, an encrypting unit 106, and a sending unit 107.

The memory unit 121 is used to store a variety of information that is for use in the transmission node 100a. For example, the memory unit 121 is used to store the encryption keys that are shared by the key sharing unit 101 and that are managed by the key managing unit 102. The memory unit 121 can be configured using any commonly-used memory medium such as a flash memory, a memory card, a random access memory (RAM), a hard disk drive (HDD), or an optical disk.

The key sharing unit 101 communicates with other nodes (an example of external communication devices: the relay nodes 200 and the receiving node 100b) and shares encryption keys. For example, the key sharing unit 101 shares encryption keys using the quantum key distribution technology such as BB84 E91. However, the method of sharing encryption keys is not limited to quantum key distribution; and, as long as the transmission node 100a is able to individually share a bit sequence with every other node, any method can be implemented. The key sharing unit 101 stores the shared encryption keys in the memory unit 121 using the key managing unit 102.

The key managing unit 102 manages the shared encryption keys in a corresponding manner to the sharing-destination nodes (the receiving node 100b and the relay nodes 200). For example, with respect to each other communication device (the receiving node 100b or one of the relay nodes 200) representing the communication partner node, the key managing unit 102 stores the shared encryption key in the memory unit 121 in a corresponding manner to that communication partner node; and thus manages the encryption keys.

FIGS. 3 and 4 are diagrams illustrating examples of the method implemented by the key managing unit 102 for managing the encryption keys. As illustrated in FIG. 3, the encryption keys can be managed as bit sequences (key values) on a node-by-bode basis. Alternatively, as illustrated in FIG. 4, the encryption keys can be managed by assigning a key identifier to each encryption key (key value) that is segmented to have a predetermined length. Still alternatively, the encryption keys can be managed by some other management method. Meanwhile, in FIGS. 3 and 4, the partner nodes are referred to by their names. However, as long as it is possible to identify the partner nodes, they can be referred to using some other format (such as the IP addresses).

In the case of implementing the management method illustrated in FIG. 3, at the time of providing an encrypted key having the length as requested by the application 103a, the key managing unit 102 assigns an appropriate key identifier to that encryption key. The method of assigning a key identifier is shared with the receiving node 100b. Hence, using the key identifier assigned by the transmission node 100a, the receiving node 100b becomes able to identify the corresponding encryption key. Meanwhile, other than providing the encryption keys, the key managing unit 102 can also output the lengths of the encryption keys or the count of the encryption keys shared by the transmission node 100a with the specified partner node.

In the case of implementing the management method illustrated in FIG. 4, the key managing unit 102 either can manage the encryption keys that have the same key length, or can manage the encryption keys in such a way that some or all of the encryption keys have different key lengths. For example, from the bit sequence shared with a partner node, the key managing unit 102 can clip the key value at the predetermined length, and can assign a key identifier to that clipped key value. When the relay node 200 represents the partner node, the key managing unit 102 can clip the key value at a relatively shorter length that is sufficient to protect the header referred to by the relay node 200 (the relay header). When the receiving node 100b represents the partner node, the key managing unit 102 can clip the key value at the length required to protect the payload, instead of clipping the key value at a relatively shorter length that is sufficient to protect the relay header.

In this way, the key managing unit 102 can perform the management in such a way that an encryption key for encrypting the header when the receiving node 100b represents the partner node (a first encryption key) has a different length than the length of an encryption key for encrypting the header when the relay node 200 represents the partner node (a second encryption key).

Meanwhile, the key sharing unit 101 and the key managing unit 102 can be implemented as separate devices from the transmission node 100a. Thus, the key managing unit 102 and the key sharing unit 101 can be integrated as a single device, or can be implemented as two separate devices. When the key sharing unit 101 and the key managing unit 102 can be implemented as separate devices from the transmission node 100a, all those devices can coordinate with each other via an interface such as Ethernet (registered trademark) or a serial bus.

Returning to the explanation with reference to FIG. 2, the application 103a has, for example, a function of sending data to and receiving data from the receiving node 100b. For example, the application 103a generates transmission data to be sent to the receiving node 100b (hereinafter, called application data). Moreover, the application 103a inputs the generated application data to the packet generating unit 104.

The packet generating unit 104 generates a packet that is to be sent. For example, the packet generating unit 104 sets the application data, which is input from the application 103a, in the payload of the packet. Moreover, the packet generating unit 104 obtains, from the deciding unit 105, a relay header meant for the application data (explained in detail later); and sets, in the header, control information to be used in delivering the packet to the next relay node 200 via the network 400. The control information contains protocol headers, such as a MAC header and an IP header, of the link layer and the network layer. Until the relay header is obtained from the deciding unit 105, the packet generating unit 104 can discontinue the packet generation operation. Alternatively, if the relay header is not obtained within a predetermined period of time, the packet generating unit 104 can cancel the packet generation operation and destroy the application data.

Figure 5:
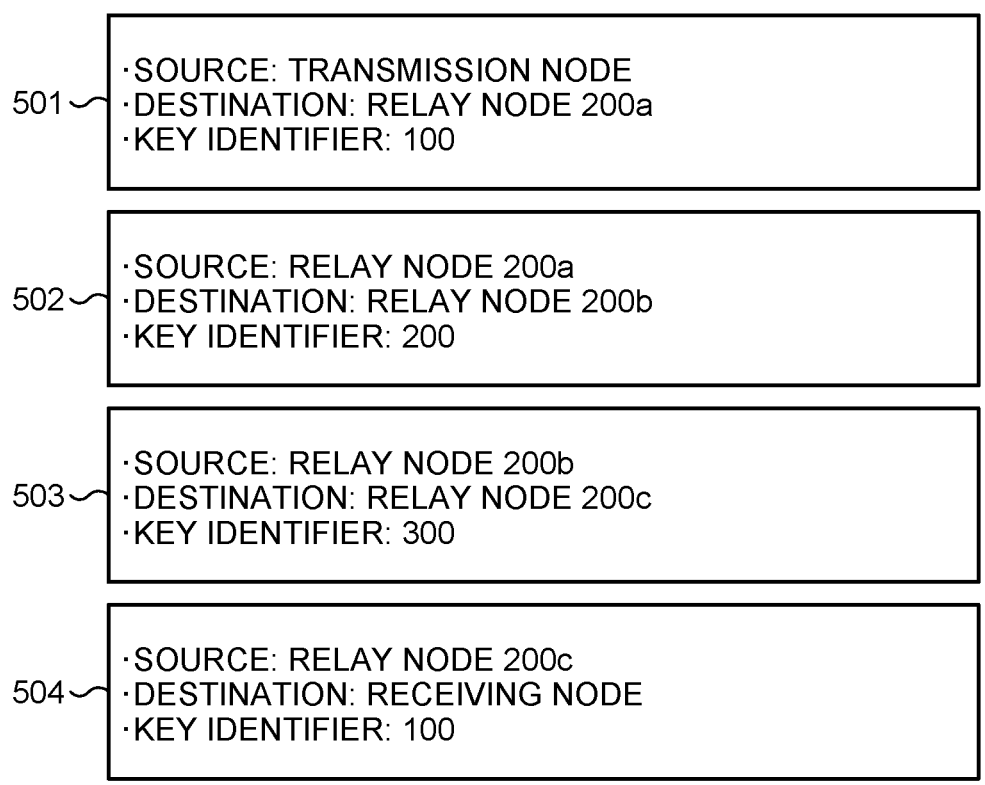
FIG. 5 is a diagram illustrating an example of a relay header.

The deciding unit 105 decides the packet relay route starting from the transmission node 100a up to the receiving node 100b. Moreover, the deciding unit 105 generates a relay header corresponding to the decided relay route. FIG. 5 is a diagram illustrating an example of the relay header. If the relay route includes the transmission node 100a, the relay node 200a, the relay node 200b, the relay node 200c, and the receiving node 100b in that order; then the deciding unit 105 generates a relay header including four pieces of relay route information, namely, relay route information 501 to relay route information 504 as illustrated in FIG. 5.

Each set of relay route information contains the source of the packet, the destination of the packet, and the key identifier of the encryption key to be used in encrypting the information to which the relay route information is added. For example, the relay route information 501 indicates the following: the transmission node 100a represents the source of the packet, the relay node 200a represents the destination of the packet, and at least some part of the data subsequent co the relay route information 501 is encrypted using an encryption key having a key identifier "100" from among the encryption keys shared between the transmission node 100a and the relay node 200a.

The deciding unit 105 decides on the relay route by taking into account the residual quantities of the encryption keys (the residual key quantities) shared between the transmission node 100a and each of the relay nodes 200. For example, firstly, the deciding unit 105 takes into account the residual key quantities and identifies (selects) the candidate relay nodes 200 that are to be included in the relay route, and then decides on the relay nodes 200 to be included in the relay route from among the identified candidate relay nodes 200.

For example, as the candidate relay nodes 200 for the relay route, the deciding unit 105 identifies the relay nodes 200 having the residual key quantities greater than a threshold value. On the other hand, regarding the relay nodes 200 having the residual key quantities equal to or smaller than the threshold value, the deciding unit 105 does not identify them as the candidate relay nodes 200 for the relay route.

From among the relay nodes 200 that are identified by taking into account the residual key quantities, the deciding unit 105 decides on the relay nodes 200 to be included in the relay route and decides on the order of relay. As a result, the relay route gets decided. Herein, the deciding unit 105 can decide on the relay route either according to a predetermined pattern or in a random manner. For example, the deciding unit 105 can sequentially select a pattern from among a plurality of predetermined Patterns given below, and accordingly decide on the relay route.

Pattern 1: the relay node 200a→the relay node 200b→the relay node 200c→the relay node 200d Pattern 2: the relay node 200b→the relay node 200c→the relay node 200d→the relay node 200a Pattern 3: the relay node 200c→the relay node 200d→the relay node 200a→the relay node 200b Pattern 4: the relay node 200d→the relay node 200a→the relay node 200b→the relay node 200c Regarding any relay node 200 having the residual key quantity greater than the threshold value, the deciding unit 105 can include that relay node 200 for a plurality of number of times in the relay route for relaying the same application data. For example, when the residual quantity, of the encryption key shared between the relay node 200b and the transmission node 100a is greater than the threshold value, the deciding unit 105 can decide on the relay route including the transmission node 100a, the relay node 200a, the relay node 200b, the relay node 200c, the relay node 200b, and the receiving node 100b in that order.

As explained earlier, the deciding unit 105 can decide on the relay route in such a way that the number of relay nodes 200 is equal to or greater than a prescribed number. For example, when the number of relay nodes satisfying the condition of the residual key quantities is smaller than the prescribed number, either the transmission of packets can be suspended or the packets can be destroyed. For example, if the prescribed number is set to "3" and if there are only two relay nodes that are sharing sufficiently large encryption keys with the transmission node; then either the transmission of packets can be suspended until the number of relay nodes sharing sufficiently large encryption keys becomes equal to or greater than three, or the packets can be destroyed.

As explained with reference to FIG. 5, the deciding unit 105 generates a relay header corresponding to the decided relay route, and outputs it to the packet generating unit 104. For example, when a request for deciding on the relay route is received from the packet generating unit 104; the deciding unit 105 decides on the relay route, generates a relay header, and outputs the relay header to the packet generating unit 104.

Upon receiving the relay header from the deciding unit 105, the packet generating unit 104 generates a packet. Then, the encrypting unit 106 encrypts the packet generated by the packet generating unit 104.

The encrypting unit 106 is configured to encrypt packets. For example, the encrypting unit 106 obtains, via the key managing unit 102, the encryption key shared with each node included in the relay route, and encrypts the relay header and the payload using the obtained encryption keys.

Figure 6:
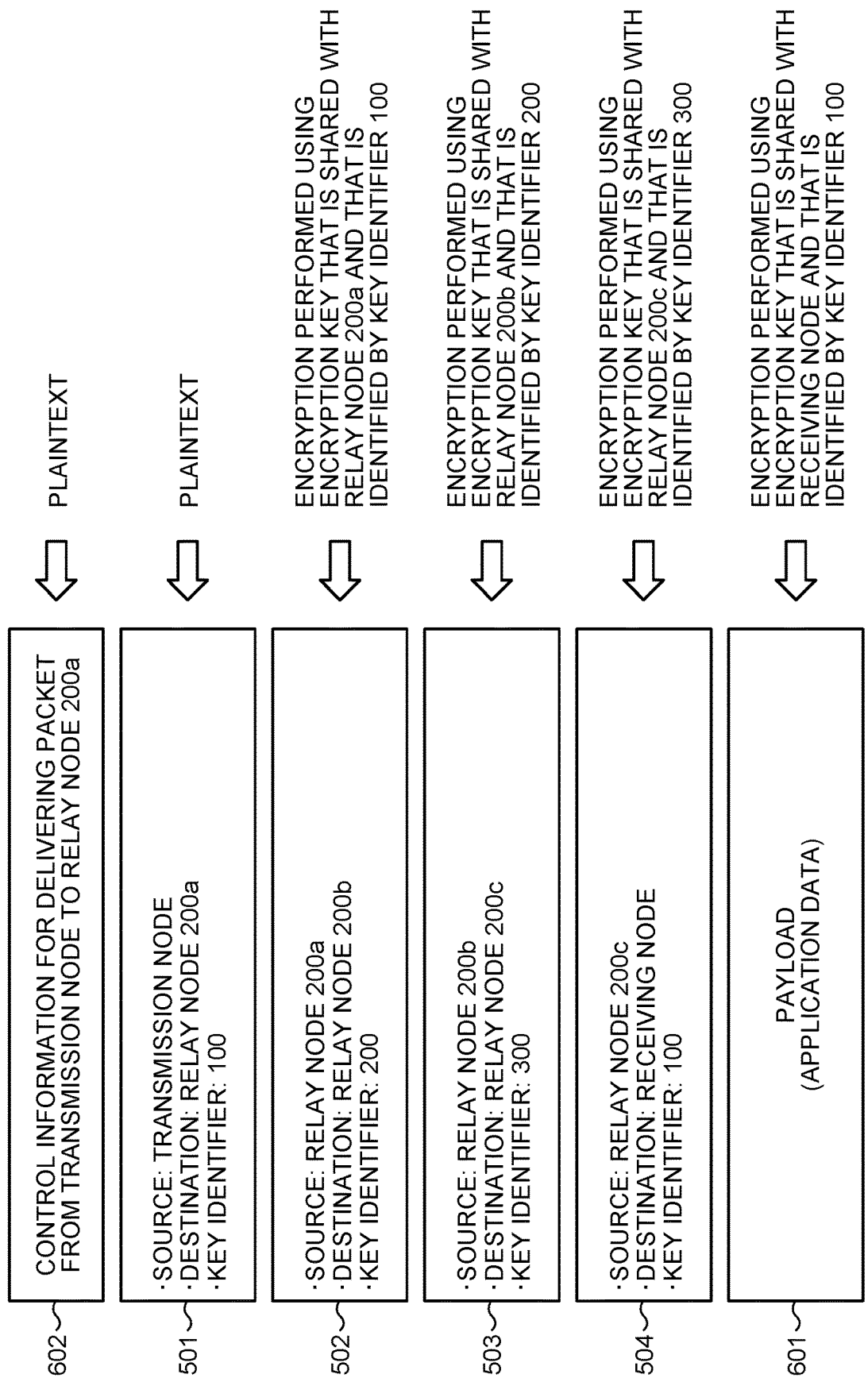
FIG. 6 is a diagram illustrating an example of the relationship between the regions to be encrypted and the encryption keys.

FIG. 6 is a diagram illustrating an example of the relationship between the regions to be encrypted, from among the regions included in a packet, and the encryption keys to be used in the encryption. In FIG. 6 is illustrated an example of encryption of a packet in which the relay header illustrated in FIG. 5 is used.

For example, a payload (application data) 601 represents the data to be used by the receiving node 100b. Hence, the encrypting unit 106 encrypts the payload 601 using one of the encryption keys shared with the receiving node 100b (using the encryption key having the key identifier "100"). The key identifier "100" implies that the encryption key can be obtained from the relay route information 504. Meanwhile, the payload need not be encrypted in entirety. That is, it serves the purpose if only some part of the payload is encrypted.

The relay route information 504 represents the data referred to by the relay node 200c. Hence, the encrypting unit 106 performs encryption using one of the encryption keys shared with the relay node 200c (using the encryption key having a key identifier "300"). The key identifier "300" implies that the encryption key can be obtained from the relay route information 503.

The relay route information 503 represents the data referred to by the relay node 200b. Hence, the encrypting unit 106 performs encryption using one of the encryption keys shared with the relay node 200b (using the encryption key having a key identifier "200"). The key identifier "200" implies that the encryption key can be obtained from the relay route information 502.

The relay route information 502 represents the data referred to by the relay node 200a. Hence, the encrypting unit 106 performs encryption using one of the encryption keys shared with the relay node 200a (using the encryption key having the key identifier "100"). The key identifier "100" implies that the encryption key can be obtained from the relay route information 501.

The relay route information 501 and control information. 602 need not be kept confidential from the relay node 200a representing the destination. Hence, that information is not encrypted by the encrypting unit 106, and is sent as plaintext. As explained earlier, the control information 602 contains protocol headers such as a MAC header and an IP header.

Thus, the encrypting unit 106 performs encryption according to an encryption method in which the quantities of encryption keys (the residual key quantities) change. Examples of such an encryption method includes one-time encryption (one-time pad). When one-time encryption is implemented, the key managing unit 102 deletes, from the memory unit 121, each encryption key that has been used in encryption. As a result, the residual key quantity decreases. On the other hand, by sharing an encryption key, the residual key quantity increases. In the method of one-time encryption, the usage count of any encryption key is limited to one. However, alternatively, it is also possible to implement an encryption method in which the usage count of an encryption key is limited to some other number.

The packet encrypted in the manner explained above is then transferred to the sending unit 107. Subsequently, the sending unit 107 sends the packet to the network 400. Thus, for example, the sending unit 107 sends, to the network 400, the packet that is generated by the packet generating unit 104 and that is encrypted by the encrypting unit 106. Then, the packet is delivered to the relay node 200a that represents the initial relay node.

Figure 7:
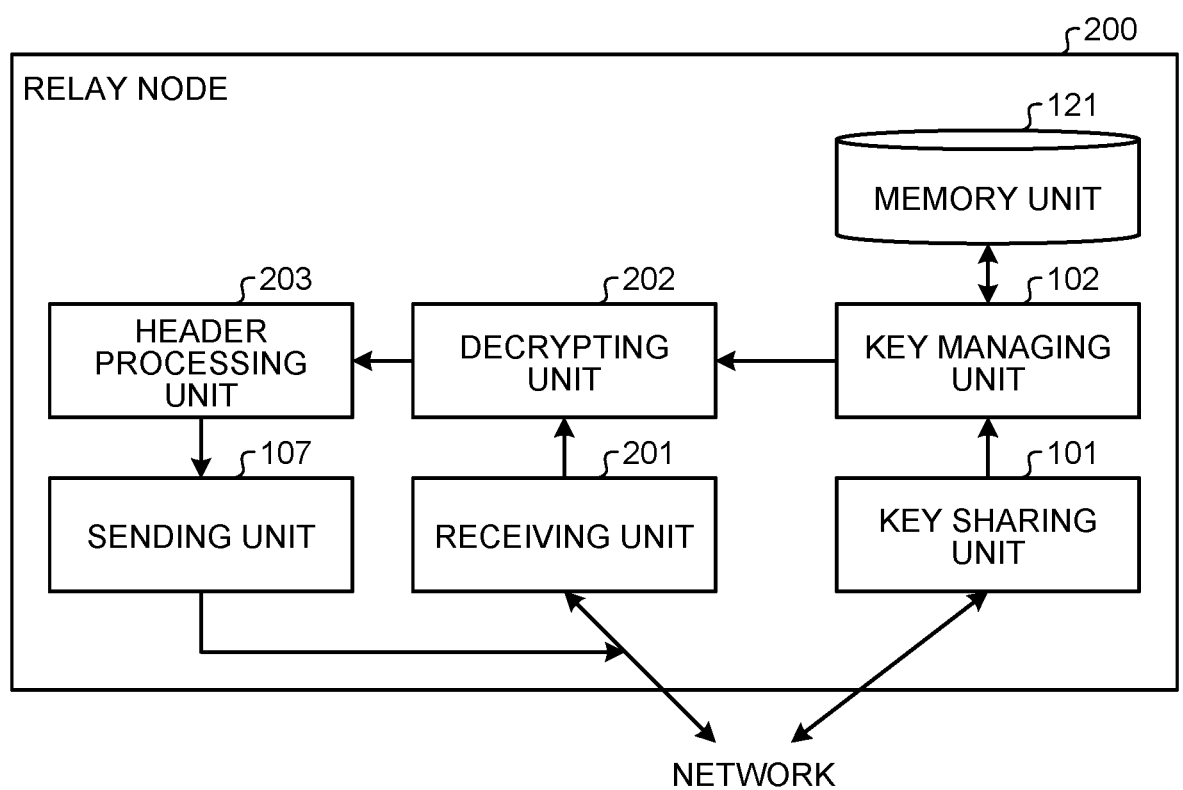
FIG. 7 is a functional block diagram of a relay node.

FIG. 7 is a block diagram illustrating an exemplary functional configuration of the relay node 200. As illustrated in FIG. 7, the relay node 200 includes the memory unit 121, the key sharing unit 101, the key managing unit 102, the sending unit 107, a receiving unit 201, a decrypting unit 202, and a header processing unit 203.

The memory unit 121, the key sharing unit 101, the key managing unit 102, and the sending unit 107 are identical to the corresponding constituent elements of the transmission node 100a. Hence, they are referred by the same reference numerals, and their explanation is not given again. For example, the memory unit 121, the key sharing unit 101, and the key managing unit 102 are used in the sharing of encryption keys. Thus, other than the fact that the partner node for sharing is different, those constituent elements have the same functions in the relay node 200 and the transmission node 100a.

The receiving unit 201 receives an encrypted packet that is sent from another node (the transmission node 100a or another relay node 200). The received packet is then transferred to the decrypting unit 202.

The decrypting unit 202 decrypts the received packet. For example, the decrypting unit 202 obtains the key identifier from the plaintext portion at the start of the relay header included in the packet. Then, the decrypting unit 202 obtains, from the memory unit 121 via the key managing unit 102, The encryption key corresponding to the obtained key identifier. Subsequently, the decrypting unit 202 uses the encryption key and decrypts the encrypted initial region of the relay header.

For example, when the packet illustrated in FIG. 6 is received in the relay node 200a, the decrypting unit 202 obtains the key identifier "100" from the initial plaintext region of the packet (i.e., the region equivalent to the relay route information 501). Moreover, the decrypting unit 202 obtains the encryption key identified by the key identifier "100". Then, using the obtained encryption key, the decrypting unit 202 decrypts the encrypted second region of the packet (i.e., the region equivalent to the relay route information 502). As a result, it becomes clear that the received packet would be further relayed from the relay node 200a to the relay node 200b.

The region to be decrypted can be instructed in the plaintext header or can be estimated from the key length of the encryption key to be used in decryption. The decrypting unit 202 can decrypt, from the encrypted region of the received packet, the data having the same length as the key length of the encryption key identified by the key identifier "100"; and can read the details of the relay header (i.e., can read the relay route information 502) from the decrypted data.

Then, the decrypting unit 202 transfers the decrypted packet to the header processing unit 203. The header processing unit 203 deletes the plaintext header that is no more required. Moreover, the header processing unit 203 updates the initial header of the packet according to the control information that is used for delivering the packet from the relay node 200a to the relay node 200b.

Figure 8:
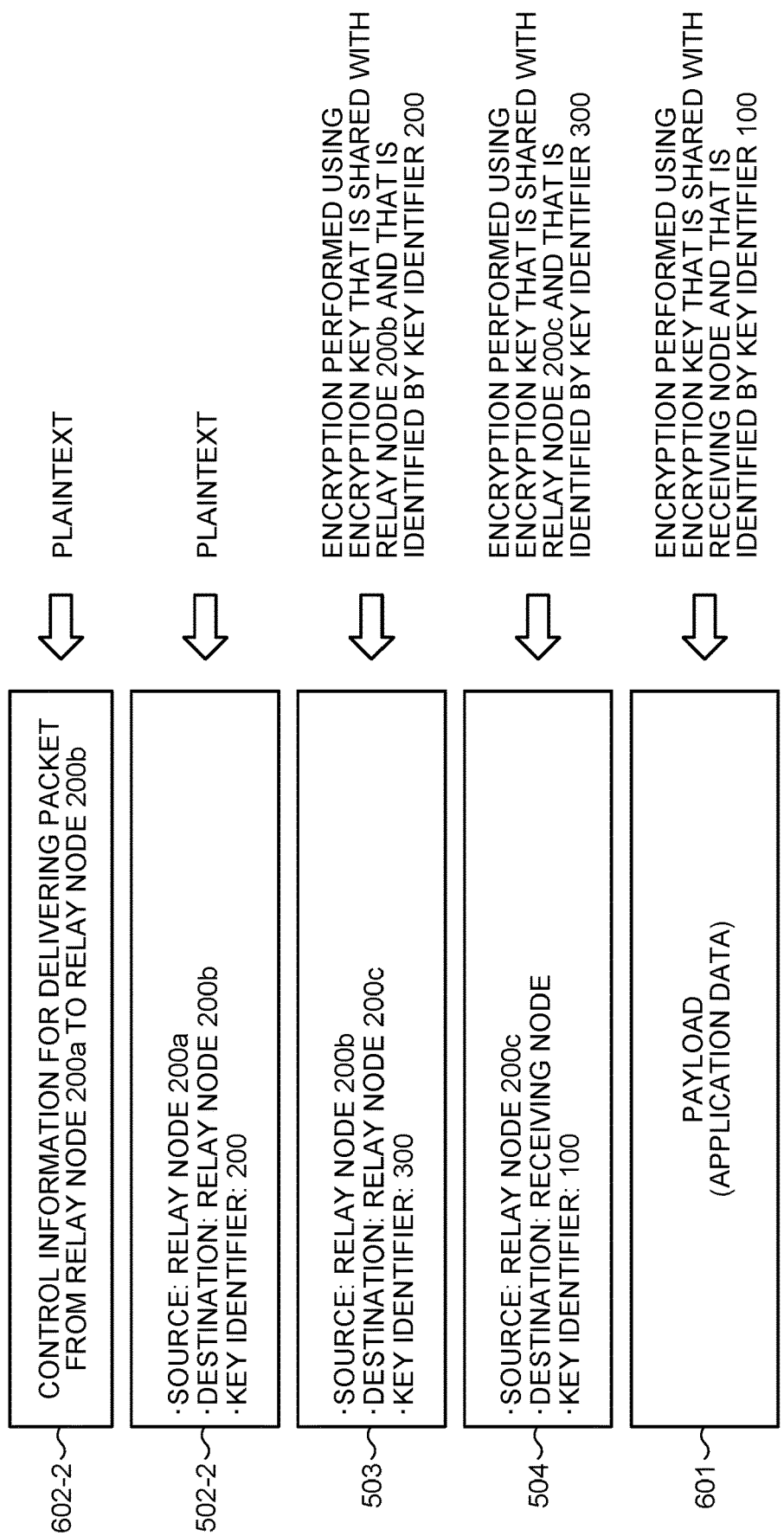
FIG. 8 is a diagram illustrating an example of the result of updating the header of a packet.

FIG. 8 as a diagram illustrating an example of the result of updating the header illustrated in FIG. 6. As compared to FIG. 6, the relay route information 501 equivalent to the now-redundant header is deleted. Moreover, the relay route information 502 is updated to relay route information 502-2 decrypted into plaintext. Furthermore, control information 602-2 is updated as the control information for delivering the packet from the relay node 200a to the relay node 200b.

The header processing unit 203 transfers the processed packet to the sending unit 107. Then, the sending unit 107 sends the packet having its header processed to the network 400. Subsequently, the packet gets delivered to the relay node 200b.

Meanwhile, it is possible that a packet having the format as illustrated in FIG. 6 is received also from some other relay node 200. Hence, during the packet processing explained with reference to FIG. 6, the relay node 200a is not able to determine whether or not the transmission node 100a is the generator (source) of the packet.

Figure 9:
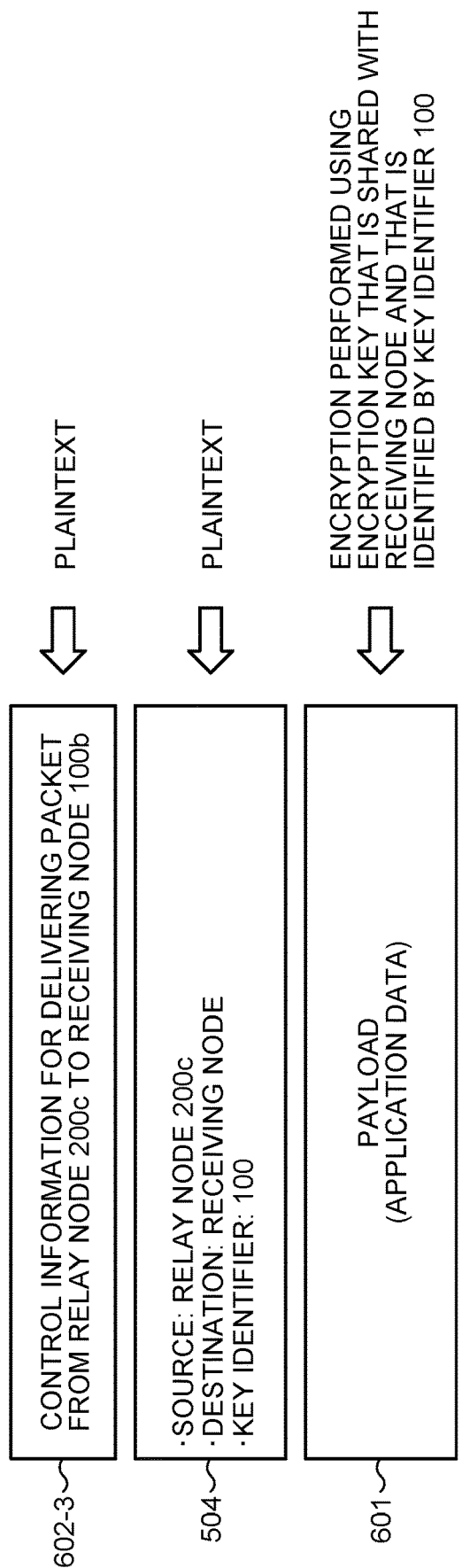
FIG. 9 is a diagram illustrating an example of a packet that is sent from a relay node to a receiving node.

Each relay node 200 included in the relay route repeatedly performs the operations explained above. As a result, the packet illustrated in FIG. 6 eventually becomes the packet illustrated in FIG. 9, and gets delivered from the relay node 200c to the receiving node 100b. FIG. 9 is a diagram illustrating an example of the packet that is sent from the relay node 200c to the receiving node 100b. Herein, control information 602-3 is updated as the control information for delivering the packet from the relay node 200c to the receiving node 100b.

Meanwhile, since the region equivalent to the payload 601 is in the encrypted form, the relay node 200c is not able to determine whether or not the relay header is included in that region. That is, the relay node 200c has no way to know that the receiving node 100b represents the final destination of the packet.

Figure 10:
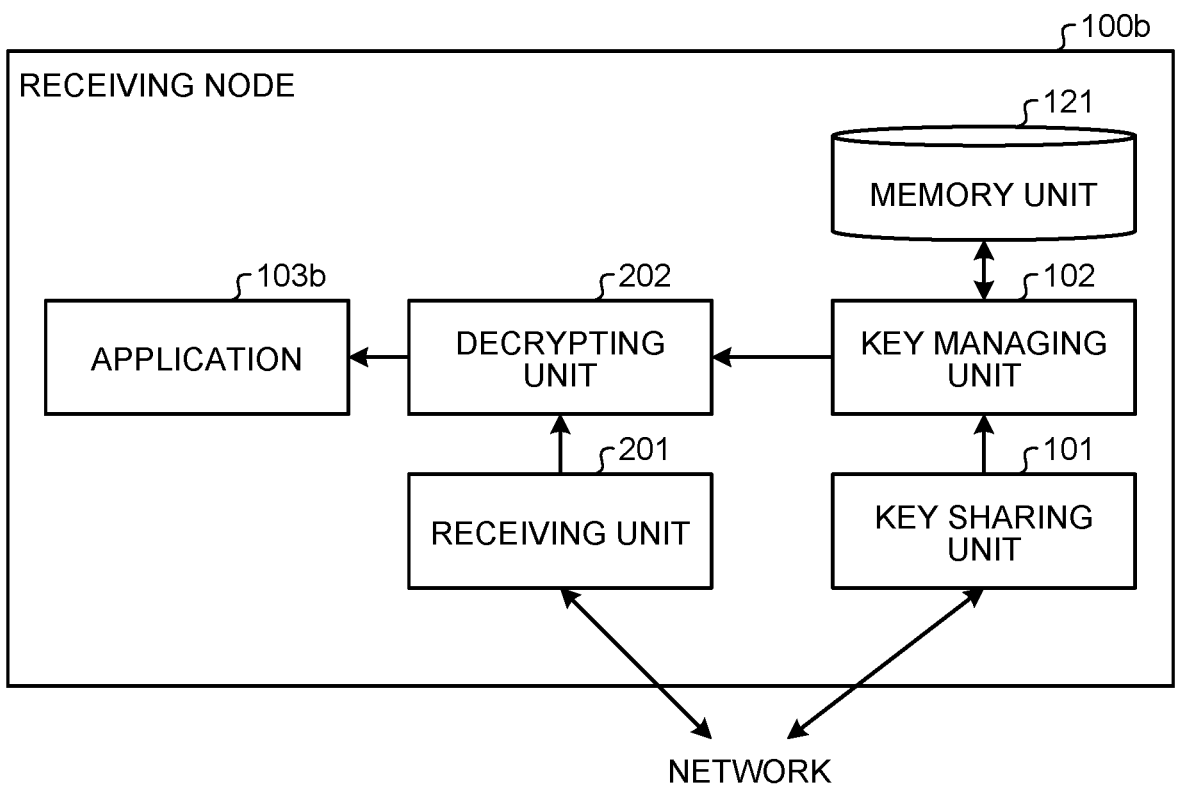
FIG. 10 is a functional block diagram of a receiving node.

FIG. 10 is a block diagram illustrating an exemplary functional configuration of the receiving node 100b. As illustrated in FIG. 10, the receiving node 100b includes the memory unit 121, the key sharing unit 101, the key managing unit 102, the receiving unit 201, the decrypting unit 202, and an application 103b.

The memory unit 121, the key sharing unit 101, the key managing unit 102, the receiving unit 201, and the decrypting unit 202 are identical to the corresponding constituent elements of the relay node 200. Hence, they are referred to by the same reference numerals, and their explanation is not given again.

The application 103b has, for example, a function of sending data to and receiving data from the transmission node 100a. For example, the application 103b processes the application data present in the payload that has been decrypted by the decrypting unit 202.

Meanwhile, the constituent elements of each of the nodes (the transmission node 100a, the receiving node 100b, and the relay nodes 200) are implemented using, for example, one or more processors. For example, the constituent elements can be implemented by making a processor such as a central processing unit (CPU) execute computer programs, that is, can be implemented using software. Alternatively, the constituent elements can be implemented using a dedicated processor such as integrated circuit (IC), that is, can be implemented using hardware. Still alternatively, the constituent elements can be implemented using a combination of software and hardware. In the case of using a plurality of processors, each processor either can implement one of the constituent elements or can implement two or more constituent elements.

From among the transmission node 100a, the receiving node 100b, and the relay nodes 200; two or three nodes can be implemented as a single node (a single communication device). In other words, a single node can be equipped with the functions or two or three nodes from among the transmission node 100a, the receiving node 100b, and the relay nodes 200.

Figure 11:
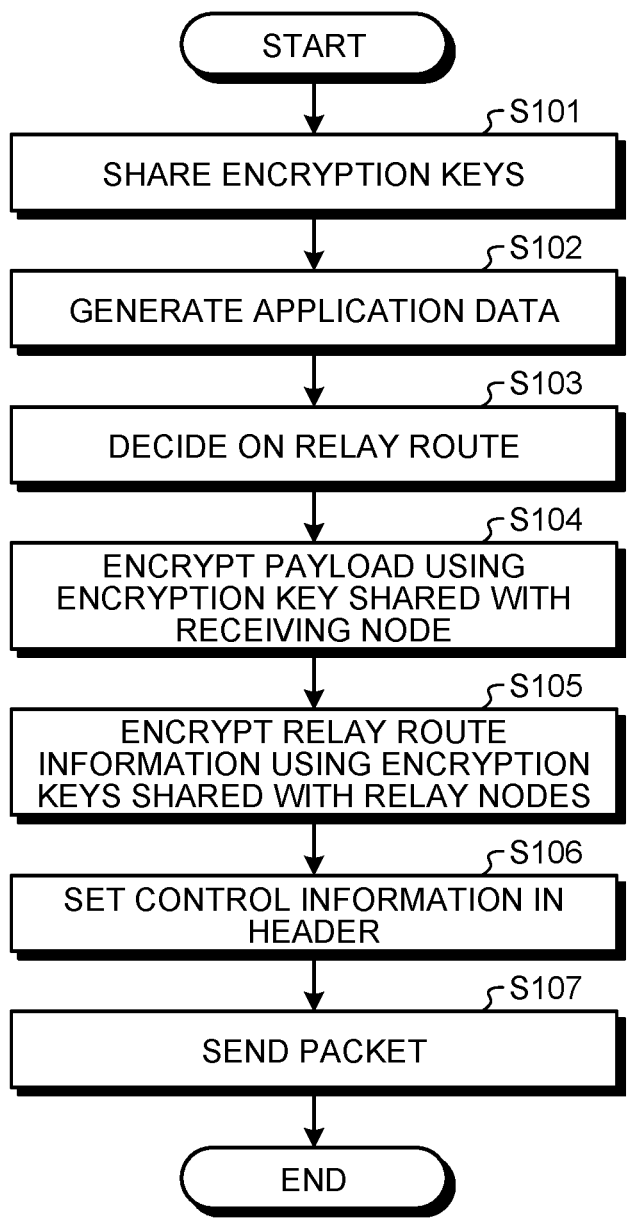
FIG. 11 is a flowchart for explaining an example of a transmission operation per formed according to the present embodiment.

Given below is the explanation of the transmission operation performed by the transmission node 100a according to the present embodiment. FIG. 11 is a flowchart for explaining an example of the transmission operation performed according to the present embodiment.

The key sharing unit 101 of the transmission node 100a shares encryption keys with other nodes (the relay nodes 200 and the receiving node 100b) (Step S101). This sharing operation can also be performed independently from the operations performed from Step S102 onward. Moreover, the sharing operation is performed also in each relay node 200 and the receiving node 100b.

For example, when there arises a need to send data to the receiving node 100b, the application 103a generates application data to be sent (Step S102). The application data is then transferred to the packet generating unit 104. At the time of generating a packet of the application data, the packet generating unit 104 requests the deciding unit 105 to decide on the relay route for the packet.

For example, when a request for deciding on the relay route is received from the packet generating unit 104, the deciding unit 105 decides on the relay route for sending the application data (Step S103). Moreover, the deciding unit 105 generates a relay header corresponding to the decided relay route and transfers it to the packet generating unit 104.

According to the relay header, the packet generating unit 104 requests the encrypting unit 106 to perform encryption. The encrypting unit 106 uses the encryption key that has been shared with the receiving node 100b, and encrypts the payload (the application data) (Step S104). Moreover, the encrypting unit 106 uses the encryption keys that have been shared with the relay nodes 200 included in the relay route, and encrypts the respective pieces of relay route information (Step S105).

The packet generating unit 104 sets the control information in the header of the packet (Step S106). The sending unit 107 sends the generated packet to the network 400 (Step S107). It marks the end of the transmission operation.

Figure 12:
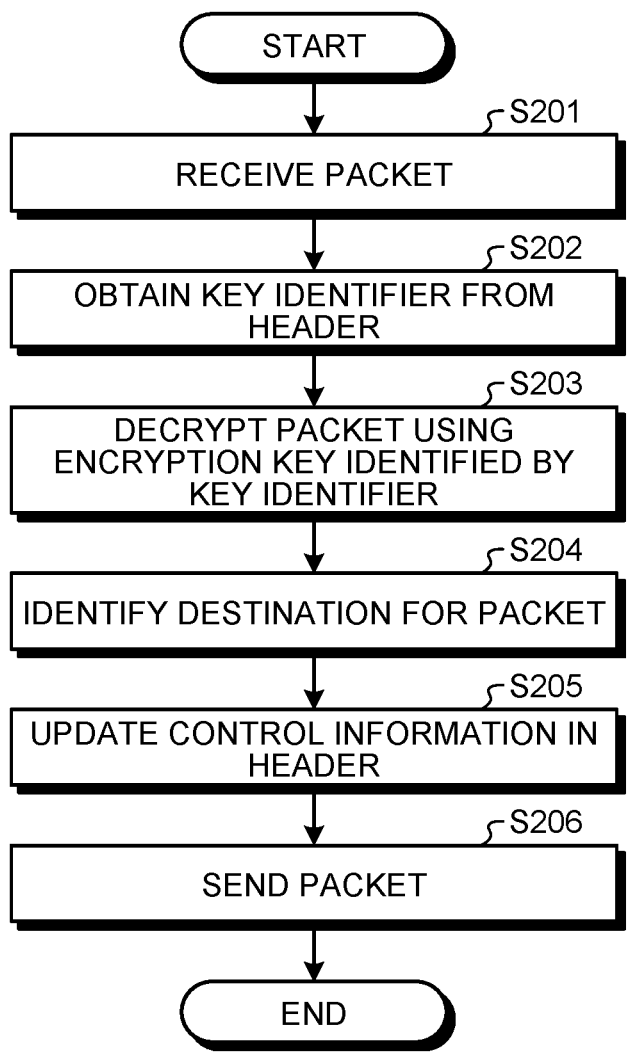
FIG. 12 is a flowchart for explaining an example of a relay operation performed according to the present embodiment.

Given below is the explanation of the relay operation performed by the relay node 200 according to the present embodiment. FIG. 12 is a flowchart for explaining an example of the relay operation performed according to the present embodiment.

The receiving unit 201 of the relay node 200 receives a packet from another node (the transmission node 100a or another relay node 200) (Step S201). The decrypting unit 202 refers to the plaintext region of the received packet and obtains the key identifier of the encryption key to be used in decryption (Step S202). Then, the decrypting unit 202 decrypts the received packet using the encryption key identified by that key identifier (Step S203).

The header processing unit 203 refers to the decrypted information and identifies the destination node for the packet (Step S204). For example, in the example illustrated in FIG. 8, the header processing unit 203 of the relay node 200a refers to the decrypted relay route information 502-2 and identifies that the relay node 200b represents the destination node for the packet.

The header processing unit 203 updates the header using the control information for delivering the packet to the identified destination (Step S205). The sending unit 107 sends the generated packet to the network 400 (Step S206). It marks the end of the relay operation.

Figure 13:
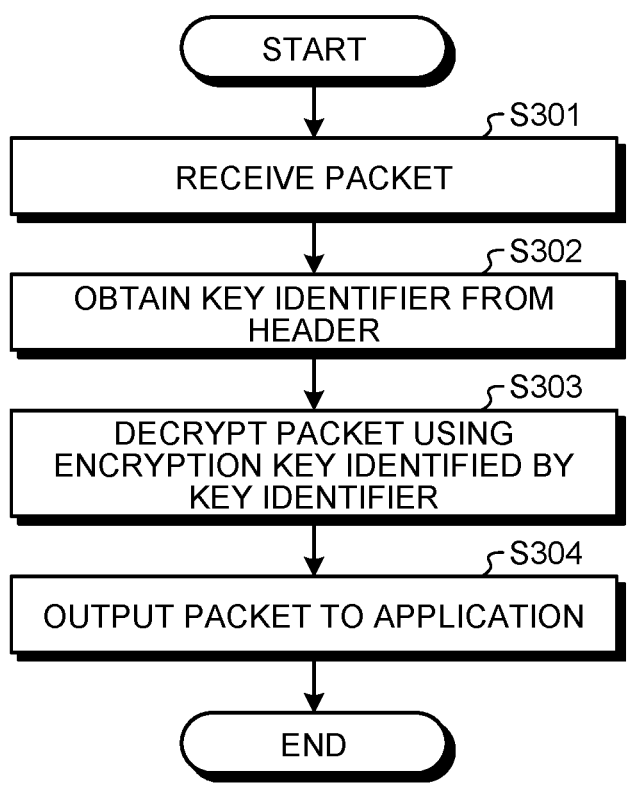
FIG. 13 is a flowchart for explaining an example of a receiving operation according to the present embodiment.

Given below is the explanation of the receiving operation performed by the receiving node 100b according to the present embodiment. FIG. 13 is a flowchart for explaining an example of the receiving operation according to the present embodiment.

The receiving unit 201 of the receiving node 100b receives a packet from another node (the relay node 200) (Step S301).

The operations performed at Steps S302 and S303 are identical to the operations performed at Steps S202 and S203, respectively, illustrated in FIG. 12.

The decrypting unit 202 outputs the decrypted packet (application data) to the application 103b (Step S304). Then, the application 103b performs processing using, for example, the application data output thereto.

Meanwhile, in this example, it is assumed that the receiving node 100b represents the destination for the application data, and that the application 103b functions correctly even when the data output from the decrypting unit 202 is used as the application data. However, for example, in a configuration in which the receiving node 100b is also equipped with the functions of the relay node 200, there are times when the decrypted data is to be relayed to another node (the relay node or some other receiving node 100b representing the final destination).

In such a case, for example, the header processing unit 203, which represents one of the functions of the relay node 200, performs the operation of identifying the destination node for the packet in an identical manner to Step S204 illustrated in FIG. 12. If the destination node cannot be identified, then the header processing unit 203 can determine that the decrypted data represents the application data, and transfer it to the application 103b.

As explained above, in the present embodiment, a packet is generated in which the header is encrypted so as to keep the communication partner unidentifiable; and then the generated packet is sent. As a result, it becomes possible to keep the information about the source and the destination confidential from an attacker or a relay node on the relay route.

Meanwhile, for example, in the onion routing technology explained in Michael G. Reed, Paul F. Syverson, and David M. Goldschlag, "Anonymous Connections and Onion Routing", Proceedings. 1997 IEEE Symposium on Security and Privacy, 1997, encryption is performed using a public key and decryption is performed using a private key. On the other hand, in the present embodiment, encryption keys having a changing residual key quantities are used, such as in the case of one-time encryption. That is, such an encryption method is implemented in which the residual key quantity increases as a result of performing the sharing operation with another node, and an encryption key is deleted upon reaching the usage count; so that the residual key quantities of the shared encryption keys change. Moreover, in the present embodiment, the relay route is decided according to the residual key quantities of the encryption keys. Thus, the relay route can be appropriately decided according to the sharing situation of the encryption keys having a changeable residual key quantities, and the information about the source and the destination can be kept confidential.

First Modification Example

Figure 14:
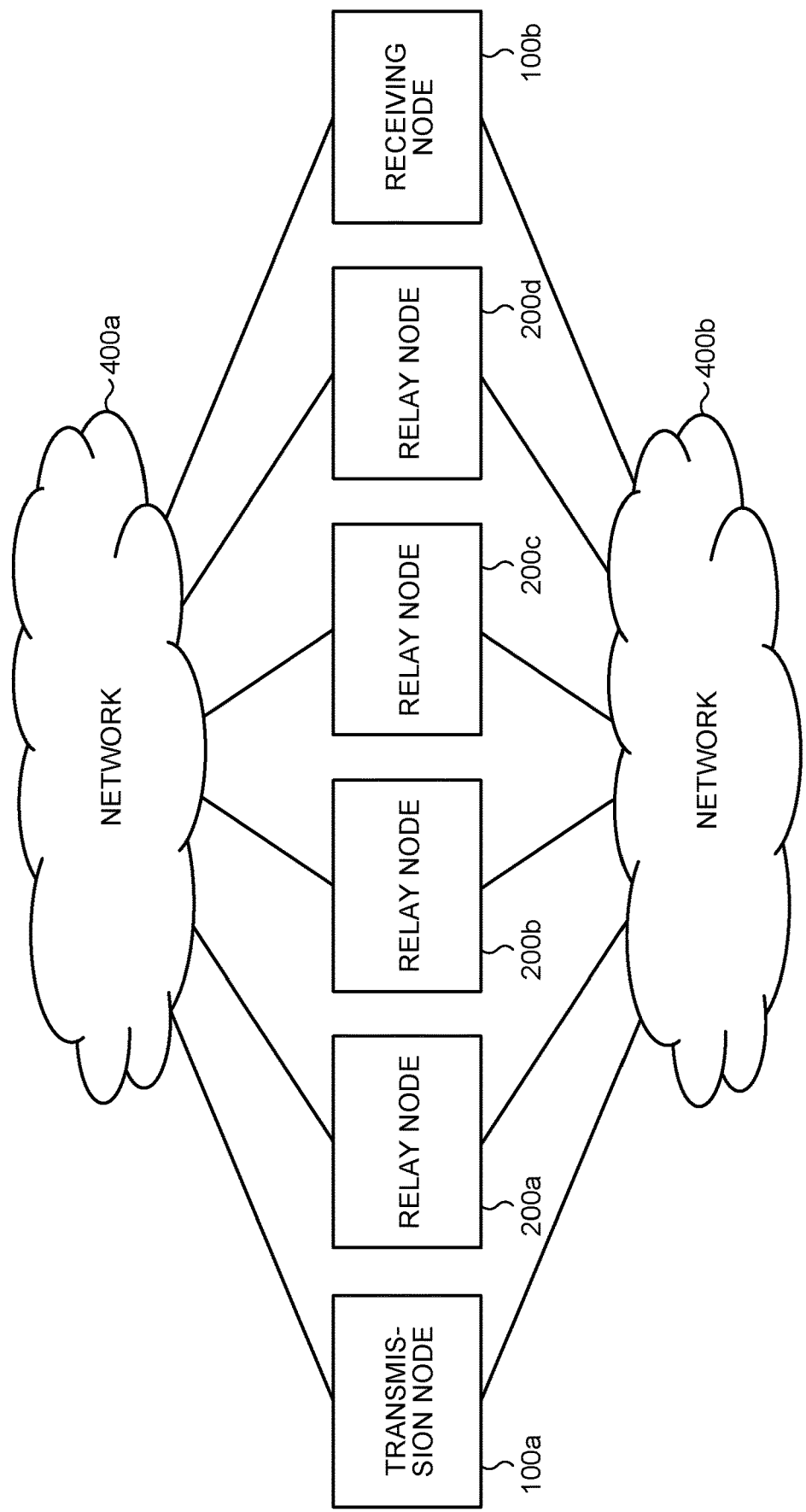
FIG. 14 is a block diagram illustrating a communication system according to a first modification example.

It is possible to have different networks for sending and receiving packets and for sharing encryption keys. FIG. 14 is a block diagram illustrating an exemplary configuration of a communication system according to a first modification example.

A network 400a represents the network to be used in sharing encryption keys. A network 400b represents the network to be used in sending and receiving packets. In the first modification example, the key sharing unit 101 of each node is connected to the network 400a. Moreover, the sending unit 107 and the receiving unit 201 of each node are connected to the network 400b.

Second Modification Example

Regarding the transmission node 100a and the receiving node 100b, their locations in the network at the point of time of sharing of the encryption key can be different than their locations at the point of time of sending and receiving a packet. For example, either the transmission node 100a, or the receiving node 100b, or the transmission node 100a as well as the receiving node 100b can be a mobile terminal in which a cellular phone network or a satellite connection is used. Moreover, the relay nodes 200 too can be mobile terminals. The sending unit 107 and the receiving unit 201 send and receive packets via the network 400 that is capable of connecting to mobile terminals.

Third Modification Example

The deciding unit 105 can decide on the relay route in such a way that the same route is not used again within a predetermined period of time. For example, the deciding unit 105 stores each decided relay route in the memory unit 121. Then, at the time of newly deciding on the relay route, the deciding unit 105 refers to the relay routes stored in the memory unit 121, and performs control in such a way that the same relay route is not used within a predetermined period of time. For example, the deciding unit 105 performs control in such a way that the same relay route is not used on a consecutive basis. Meanwhile, a limit can be set on the number of relay routes to be stored in the memory unit 121. For example, the configuration can be such that, when the limit is exceeded, the deciding unit 105 deletes older relay routes from the memory unit 121.

Fourth Modification Example

The deciding unit 105 can decide on the relay route in such a way that the amount of time from when a packet is transmitted to when the packet arrives at the receiving node 100b is within a stipulated amount of time. For example, in the memory unit 121, the transmission node 100a stores measurement information indicating the period of communication delay between itself and another node and stores measurement information indicating the period of communication delay between two other nodes. The deciding unit 105 refers to such measurement information and decides on the relay route in such a way that the period of time required for a packet, which is sent from the transmission node 100a, to reach the receiving node 100b is within the stipulated amount of time. In the case of sending a plurality of packets in a repeated manner, the deciding unit 105 can decide on the relay route in such a way that the time interval between the arrival of packets in the receiving node 100b is within a predetermined range. Moreover, in that case, the deciding unit 105 can decide on the relay route in such a way that the period of time required for the arrival of a packet is within the stipulated amount of time as well as the time interval between the arrival of packets is within the predetermined range.

Fifth Modification Example

The packet generating unit 104 can add dummy data to the application data set in the payload. The length of the dummy data can be decided according to the length of the application data. For example, when the application data is sufficiently long, the length of the dummy data is set to zero, and thus the packet generating unit 104 does not add dummy data. However, when the application data is short in length, the packet generating unit 104 adds long dummy data to the application data. As a result of adding the dummy data, the fact that the receiving node 100*b* represents the final destination can be kept confidential from the last relay node 200 on the relay route.

Figure 15:
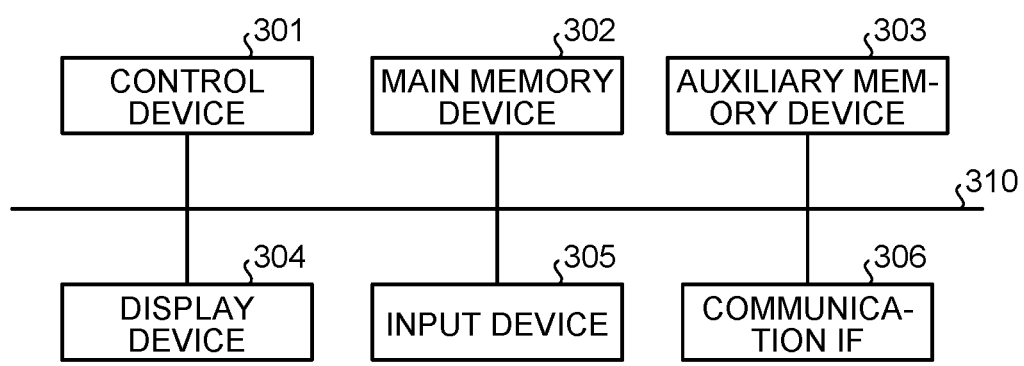
FIG. 15 is a diagram illustrating an exemplary hardware configuration of the communication devices.

FIG. 15 is a diagram illustrating an exemplary hardware configuration of each node (the transmission node, the receiving node, and the relay node) according to the embodiment and the modification examples described above. Each node includes a control device 301, a main memory device 302, an auxiliary memory device 303, a display device 304, an input device 305, and a communication interface (IF) 306.

The control device 301, the main memory device 302, the auxiliary memory device 303, the display device 304, the input device 305, and the communication IF 306 are connected co each other via a bus 310.

The control device 301 executes computer programs that are read from the auxiliary memory device 303 into the main memory device 302. The main memory device 302 is a memory such as a read only memory (ROM) or a RAM. The auxiliary memory device 303 is a hard disk drive (HDD) or a memory card.

The display device. 304 is used to display the state of the corresponding node. The input device 305 receives input from the user. The communication IF 306 is an interface for connecting to the network 400. Meanwhile, the node need not include the display device 304 and the input device 305. In the case of not including the display device 304 and the input device 305; for example, the node can use the display function and the input function of an external terminal connected via the communication IF 306.

The computer program executed in the communication device (node) according to the present embodiment is stored in advance in a ROM.

Alternatively, the computer program executed in the communication device according to the present embodiment can be recorded as an installable file or an executable file in a computer-readable recording medium such as a compact disk read only memory (CD-ROM), a flexible disk (FD), a compact disk recordable (CD-R), or a digital versatile disk (DVD); and can be provided as a computer program product.

Still alternatively, the computer program executed in the communication device according to the present embodiment can be stored in a downloadable manner in a computer connected to a network such as the Internet. Still alternatively, the computer program executed in the communication device according to the present embodiment can be distributed via a network such as the Internet.

The computer program executed in the communication device according to the present embodiment can make a computer function as the constituent elements of the communication device. In the computer, the control device 301 can read the computer program from a computer-readable memory medium into the main memory device 302, and execute the computer program.

While a certain embodiment have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A communication device comprising:
one or more hardware processors configured to:
share encryption keys with a plurality of external communication devices, the encryption keys being used in an encryption method in which residual quantities of the encryption keys change;
decide on a route for sending transmission data, based on the residual quantities of the encryption keys;
encrypt one or more headers, each of the one or more headers corresponding to one of one or more first external communication devices among the plurality of external communication devices, the one or more first external communication devices being included in the route, each of the one or more headers being a header in which the corresponding one of the one or more first external communication devices is set as a destination, each of the one or more headers being encrypted using one of the encryption keys shared with the corresponding one of the one or more first external communication devices;
generate a packet that includes the transmission data and the one or more headers; and
send the generated packet along the route,
wherein the one or more hardware processors decide on the route that includes the one or more first external communication devices, a number of the one or more first external communication devices included in the route being greater than a prescribed number, from among the plurality of external communication devices.

2. The communication device according to claim 1, wherein the one or more hardware processors decide on the route in such a way that a same route is not used again within a predetermined period of time.

3. The communication device according to claim 1, wherein the one or more hardware processors decide on the route in such a way that an amount of time from when the packet is transmitted to when the packet arrives at one of the one or more first external communication devices that is a receiving device for receiving the transmission data, is within a stipulated amount of time.

4. The communication device according to claim 1, wherein the one or more hardware processors identify one or more second external communication devices having the residual quantities of the encryption keys greater than a threshold value, and decide on the route that includes the one or more first external communication devices from among the second external communication devices.

5. The communication device according to claim 1, wherein the one or more hardware processors manage the shared encryption keys, in such a way that a length of a first encryption key is different than a length of a second encryption key, the first encryption key being used for encrypting a header in a case in which an external communication device is a receiving device that receives the transmission data, the second encryption key being used for encrypting a header in a case in which an external communication device is a relay device that relays the transmission data to another external communication device.

6. The communication device according to claim 1, wherein the one or more hardware processors use a quantum key distribution for sharing the encryption keys with the plurality of external communication devices.

7. The communication device according to claim 1, wherein the one or more hardware processors encrypt the header using the encryption key according to one-time encryption.

8. The communication device according to claim 1, wherein
the one or more hardware processors send the packet via a network capable of connecting to some of the plurality of external communication devices that are used while being moved.

9. A communication method implemented in a communication device, comprising:
sharing encryption keys with a plurality of external communication devices, the encryption keys being used in an encryption method in which residual quantities of the encryption keys change;
deciding on a route for sending transmission data, based on the residual quantities of the encryption keys;
encrypting one or more headers, each of the one or more headers corresponding to one of one or more first external communication devices among the plurality of external communication devices, the one or more first external communication devices being included in the route, each of the one or more headers being a header in which the corresponding one of the one or more first external communication devices is set as a destination, each of the one or more headers being encrypted using one of the encryption keys shared with the corresponding one of the one or more first external communication devices;
generating a packet that includes the transmission data and the one or more headers; and
sending the generated packet along the route,
wherein the deciding includes deciding on the route that includes the one or more first external communication devices, a number of the one or more first external communication devices included in the route being greater than a prescribed number, from among the plurality of external communication devices.

10. A communication system comprising:
one or more transmission devices;
one or more relay devices; and
one or more receiving devices, wherein
the one or more transmission devices each include one or more hardware processors configured to:
share encryption keys with external communication devices including the one or more relay devices and the one or more receiving devices, the encryption keys being used in an encryption method in which residual quantities of the encryption keys change;
decide on a route for sending transmission data to a receiving device, based on the residual quantities of the encryption keys;
encrypt one or more headers, each of the one or more headers corresponding to one of one or more first external communication devices among the plurality of external communication devices, the one or more first external communication devices being included in the route, each of the one or more headers being a header in which the corresponding one of the one or more first external communication devices is set as a destination, each of the one or more headers being encrypted using one of the encryption keys shared with the corresponding one of the one or more first external communication devices;
generate a packet that includes the transmission data and the one or more encrypted headers; and
send the generated packet along the route,
wherein the one or more hardware processors decide on the route that includes the one or more first external communication devices, a number of the one or more first external communication devices included in the route being equal to or greater than a prescribed number, from among the plurality of external communication devices.

* * * * *